US012719003B2

(12) United States Patent
Kim

(10) Patent No.: US 12,719,003 B2
(45) Date of Patent: Aug. 25, 2026

(54) RELAY AND BATTERY SYSTEM INCLUDING THE SAME

(71) Applicant: LG Energy Solution, Ltd., Seoul (KR)

(72) Inventor: Ki Hyun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 804 days.

(21) Appl. No.: 18/040,199

(22) PCT Filed: Aug. 26, 2021

(86) PCT No.: PCT/KR2021/011471
§ 371 (c)(1),
(2) Date: Feb. 1, 2023

(87) PCT Pub. No.: WO2022/050636
PCT Pub. Date: Mar. 10, 2022

(65) Prior Publication Data

US 2023/0343534 A1 Oct. 26, 2023

(30) Foreign Application Priority Data

Sep. 1, 2020 (KR) ........................ 10-2020-0111252

(51) Int. Cl.
*H01H 50/24* (2006.01)
*H01H 9/44* (2006.01)
(Continued)

(52) U.S. Cl.
CPC ............ *H01H 50/24* (2013.01); *H01H 9/443* (2013.01); *H01H 50/643* (2013.01); *H02J 7/60* (2026.01);
(Continued)

(58) Field of Classification Search
CPC ...... H01H 50/24; H01H 9/443; H01H 50/643; H01H 50/546; H02J 7/60; H02J 7/855;
(Continued)

(56) References Cited

U.S. PATENT DOCUMENTS 6,064,024 A 5/2000 Moldovan
6,700,466 B1 3/2004 Yamamoto et al.
(Continued)

FOREIGN PATENT DOCUMENTS

CN 104275331 A 1/2015
CN 105374632 A 3/2016
(Continued)

OTHER PUBLICATIONS

International Search Report for Application No. PCT/KR2021/011471 mailed Dec. 6, 2021, pp. 1-3.
(Continued)

*Primary Examiner* — Mohamad A Musleh
(74) *Attorney, Agent, or Firm* — Lerner David LLP

(57) ABSTRACT

A relay includes a switching device including a moving contact bar electrically connecting two contact terminals when a current flows through a coil, a magnetic device including two magnets facing each other based on a virtual reference line connecting the two contact terminals and surrounding the switching device, a rotation and supporting member positioned between a coupling interior circumference, which is some area of the interior circumference of the magnetic device, and some external circumferential surface of the switching device, the positions corresponding to the combined interior circumference in order for the magnetic device to be supported and rotated with respect to the switching device, and a current sensor that detects the direction of the current flowing between the two contact terminals. The two magnets may be rotated depending on the direction of the current.

13 Claims, 9 Drawing Sheets

(51) Int. Cl.

*H01H 50/64* (2006.01)
*H02J 7/00* (2006.01)
*H02J 7/60* (2026.01)
*H01H 50/54* (2006.01)

(52) U.S. Cl.

CPC ............ *H02J 7/855* (2026.01); *H01H 50/546* (2013.01); *H02J 7/663* (2026.01)

(58) Field of Classification Search

CPC .......... H02J 7/663; H02J 7/50; H01M 10/425; H01M 10/42; Y02E 60/10; H02K 7/116

See application file for complete search history.

(56) References Cited

U.S. PATENT DOCUMENTS

| | | | |
|---|---|---|---|
| 8,853,585 | B2 | 10/2014 | Tachikawa et al. |
| 2013/0214881 | A1 | 8/2013 | Ito et al. |
| 2013/0214882 | A1 | 8/2013 | Ito et al. |
| 2013/0214884 | A1 | 8/2013 | Ito et al. |
| 2015/0013085 | A1 | 1/2015 | An et al. |
| 2017/0018386 | A1 | 1/2017 | Lee |
| 2021/0027963 | A1 | 1/2021 | Zhang et al. |

FOREIGN PATENT DOCUMENTS

| | | | |
|---|---|---|---|
| CN | 208622653 | U | 3/2019 |
| EP | 2824683 | A1 | 1/2015 |
| JP | 2001118451 | A | 4/2001 |
| JP | 2005056819 | A | 3/2005 |
| JP | 2008226547 | A | 9/2008 |
| JP | 2013246873 | A | 12/2013 |
| JP | 2015018789 | A | 1/2015 |
| JP | 5829618 | B2 | 12/2015 |
| JP | 6244995 | B2 | 12/2017 |
| KR | 20100040819 | A | 4/2010 |
| KR | 20150127838 | A | 11/2015 |
| KR | 101581182 | B1 | 12/2015 |
| KR | 20170009348 | A | 1/2017 |

OTHER PUBLICATIONS

Extended European Search Report including Written Opinion for Application No. 21864596.8 dated Nov. 20, 2023, pp. 1-12.

RELAY AND BATTERY SYSTEM INCLUDING THE SAME

CROSS-REFERENCE TO RELATED APPLICATIONS

The present application is a national phase entry under 35 U.S.C. § 371 of International Application No. PCT/KR2021/011471 filed Aug. 26, 2021, which claims priority from Korean Patent Application No. 10-2020-0111252 filed Sep. 1, 2020, all of which are incorporated herein by reference.

BACKGROUND OF THE INVENTION

Technical Field

The present disclosure relates to a relay and a battery system including the same.

Background Art

If a relay is opened while a high current is flowing in a battery system, an arc occurs. In a conventional art, a magnet is used to form the direction of the arc that occurs when the relay is opened while the high current flows in one direction into an outside of a contact terminal. This may improve the durability of the relay. However, the arc generated when the relay is opened while high current flows in the direction opposite to the one direction travels into an inside of the contact terminal. This may reduce the durability of the relay.

Due to this limitation, the conventional battery system cannot increase both direction currents. That is, the battery system may increase current flowing in one direction, but cannot increase current flowing in the other direction.

SUMMARY

Technical Problem

The present disclosure is to provide a relay that can improve the cycle-life of the contact terminal for current flowing in both directions by changing the magnetic field according to the direction of the current, and a battery system including the same.

Technical Solution

A battery system according to one aspect of the present invention may include: a battery pack including a plurality of battery cells; and a relay including a first contact terminal connected to one end of the battery pack and a second contact terminal connected to an output terminal, and the relay may include a magnetic device that changes the magnetic field according to the direction of the current flowing between the first contact terminal and the second contact terminal.

A relay according to another aspect of the present invention includes: a switching device including a moving contact bar electrically connecting two contact terminals when a current flows through a coil; a magnetic device surrounding the switching device and including two magnets facing each other and aligned with one another along a virtual reference line connecting the two contact terminals; a support positioned between an interior portion of an interior circumference of the magnetic device, and an exterior portion of an external circumferential surface of the switching device, and configured to support the magnetic device, wherein the magnetic device is rotatable while being supported by the support; a current sensor configured to detect a direction of a corresponding current flowing between the two contact terminals; and a controller configured to control a rotation of the two magnets depending on the detected direction of the corresponding current.

The relay may further include a base coupled to a bottom surface of the switching device, wherein the switching device is affixed to the base.

The magnetic device may further include a magnet rotation part; and two magnets positioned on an upper surface of the magnetic rotation part and facing one another in a fixed position relative to one another, and the control may be configured to, in response to a change in the direction of the corresponding current, rotate the magnet rotation part such that respective positions of the two magnets switch with each other.

The magnet rotation part may include a first gear block including a first plurality of gear teeth formed along an interior circumference of the first gear block, the relay may include a motor including a second gear block including a second plurality of gear teeth formed in a circular shape, wherein the second gear block is positioned at a bottom end of a shaft, and the second gear block and the first gear block may be positioned such that the first gear teeth are engaged with the second gear teeth.

The relay may further include a motor driver configured to drive the motor to rotate 180 degrees in response to the change in the direction of the corresponding current.

Each of the two magnets may have a semi-annular shape, and the magnet rotation part may have an annular shape.

The controller may be configured to, in response to the current flowing in a first direction, position a first magnet of the two magnets on a first side of the virtual reference line, and a second magnet of the two magnets on a second side of the virtual reference line, in response to the corresponding current flowing in a second direction opposite the first direction, position the first magnet on the second side of the virtual reference line, and the second magnet on the first side of the virtual reference line. The support may be a ball bearing.

Advantageous Effects

The relay and the battery system, which can improve the cycle-life of the contact terminal for the currents of both directions by changing the magnetic field according to the direction of the current, are provided.

DETAILED DESCRIPTION

Figure 1:
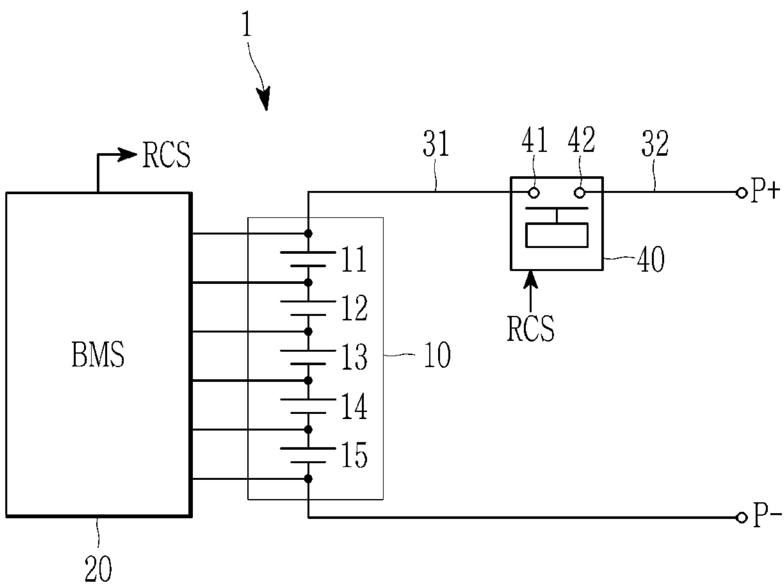
FIG. 1 is a view showing a configuration of a battery system according to an exemplary embodiment.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to easily make a specification. Therefore, these terms do not have meanings or roles that distinguish them from each other in themselves. Further, in describing embodiments of the present specification, when it is determined that a detailed description of the well-known art associated with the present invention may obscure the gist of the present invention, it will be omitted. In addition, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected or coupled to another component without a further component intervening therebetween.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 is a view showing a configuration of a battery system according to an exemplary embodiment.

A battery system 1 includes a battery pack 10, a battery management system (BMS) 20, and a relay 40. FIG. 1 shows only one battery pack, but the invention is not limited thereto, and the battery system 1 may include two or more battery packs. In addition, two or more battery packs may be connected in series or in parallel, a plurality of battery packs that are connected in series may be connected in parallel, or a plurality of battery packs that are connected in parallel may be connected in series.

The battery pack 10 includes a plurality of battery cells 11-15 connected in series. In FIG. 1, the battery pack 10 is illustrated as including five battery cells 11-15, but this is an example and the invention is not limited thereto.

The BMS 20 is connected to a plurality of battery cells 11-15 to measure a cell voltage of a plurality of battery cells 11 to 15. The BMS 20 acquires a battery pack 10 voltage, a battery pack current, and a battery pack temperature. The BMS 20 may control the charging and discharging current of the battery pack 10 based on the cell voltage and the battery pack current of a plurality of battery cells 11-15, and control the cell balancing operation for a plurality of battery cells 11-15.

In addition, the BMS 20 controls opening and closing of the relay 30 for the charging and discharging control of the battery pack 10. The BMS 20 generates a relay control signal (RCS) that controls the opening and closing of the relay 40 to be supplied to the relay 40.

The relay 40 is opened and closed according to the relay control signal RCS and includes two contact terminals 41 and 42, the contact terminal 41 is connected to a positive electrode of the battery pack 10 through a line 31, and the contact terminal 41 is connected to an output terminal P+ through a line 32.

In FIG. 1, only one relay is shown, but the invention is not limited thereto, and the battery system 1 may further include a relay connected between a negative electrode of the battery pack 10 and an output terminal P−.

Figure 2:
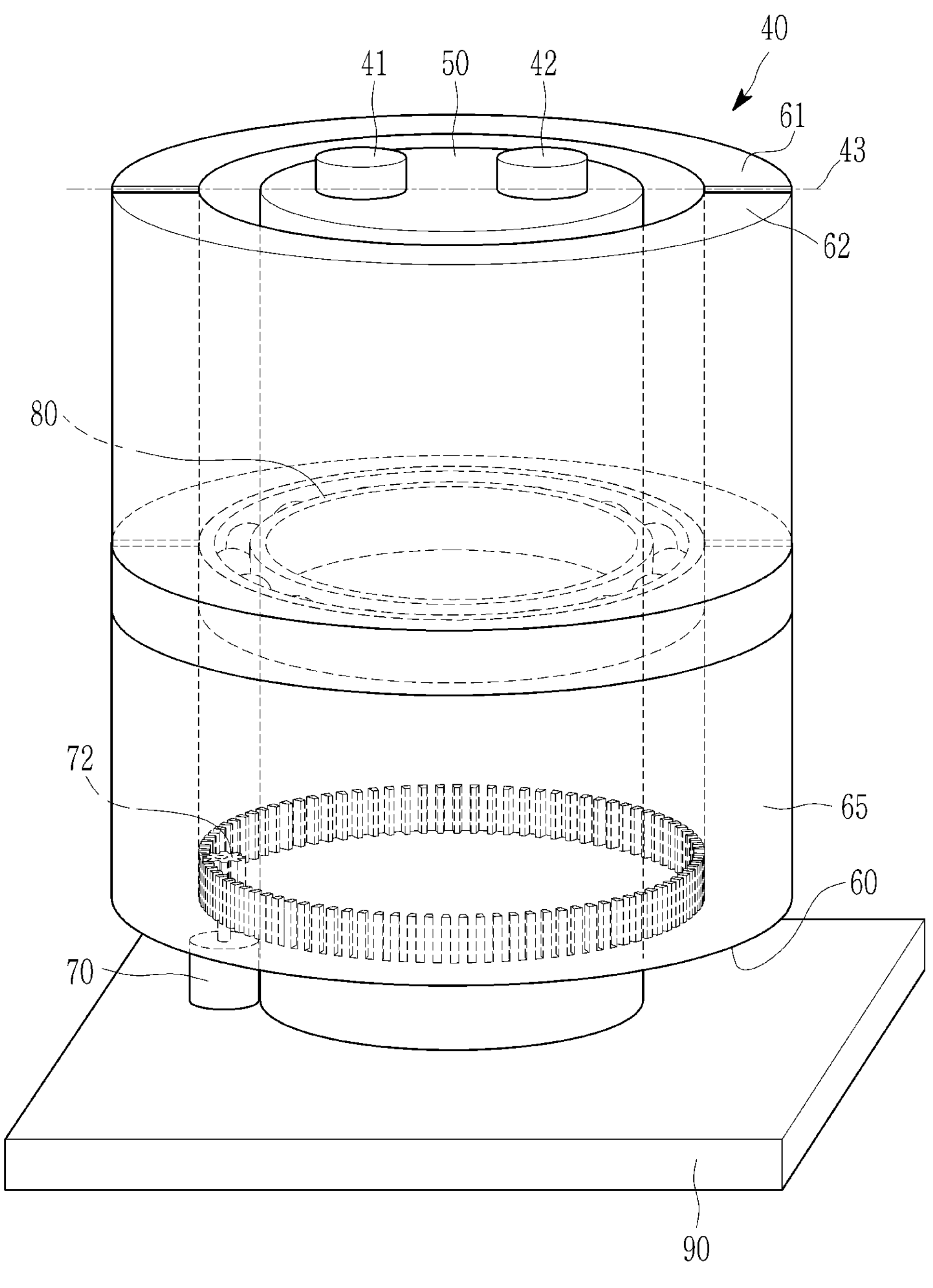
FIG. 2 is a perspective view showing a relay according to an exemplary embodiment.

FIG. 2 is a perspective view showing a relay according to an exemplary embodiment.

In FIG. 2, even a configuration that is positioned inside and then is invisible is shown with dotted lines for convenience of explanation.

As shown in FIG. 2, the relay 40 includes a switching device 50, a magnetic device 60, a motor 70, a ball bearing 80, and a fixing substrate 90.

The switching device 50 controls an electrical connection between the two contact terminals 41 and 42. The switching device 50 and the magnetic device 60 may be coupled by various rotation and supporting members. The rotation and support member may be a member supporting the switching device 50 and the magnetic device 60 so as to surround the switching device 50 with a distance to be rotational with respect to the fixed switching device 50, and allowing the magnetic device 60 to rotate around the switching device 50. For example, the rotation and support member may be implemented with various types of bearings. In FIG. 2, a ball bearing 80 is shown as a rotation and support member, but the invention is not limited thereto.

The coupling part 51 of the switching device 50 may be attached with the interior circumference of the ball bearing 80 by various coupling means. The magnetic device 60 includes two magnets 61 and 62, and a magnet rotation part 65.

The two magnets 61 and 62 face each other based on a virtual reference line 43 connecting the two contact terminals 41 and 42, and surround the switching device 50. On the upper surface of the magnet rotation part 65, the two magnets 61 and 62 face each other and are fixed, and their positions are changed based on the virtual reference line 43 according to the rotation of the magnet rotation part 65. The magnet rotation part 65 may be rotated by the motor 70 to rotate the two magnets 61 and 62. Among the interior circumference of the magnet rotation part 65, the area 63 attached to the external circumferential surface of the ball bearing 80 is positioned.

The bottom surface of the switching device 50 is fixed by bonding to the fixing substrate 90. Accordingly, when the motor 70 is driven, the magnet rotation part 65 rotates, and the two magnets 61 and 62 coupled to the magnet rotation part 65 also rotate.

The structure illustrated in FIG. 2 is an example of a structure in which the positions of the two magnets 61 and 62 can be exchanged with respect to the virtual reference line 43. The present invention is not limited to the structure shown in FIG. 2, and any one of various structures in which the positions of the two magnets 61 and 62 may be exchanged with respect to the virtual reference line 43 may be applied.

Figure 3:
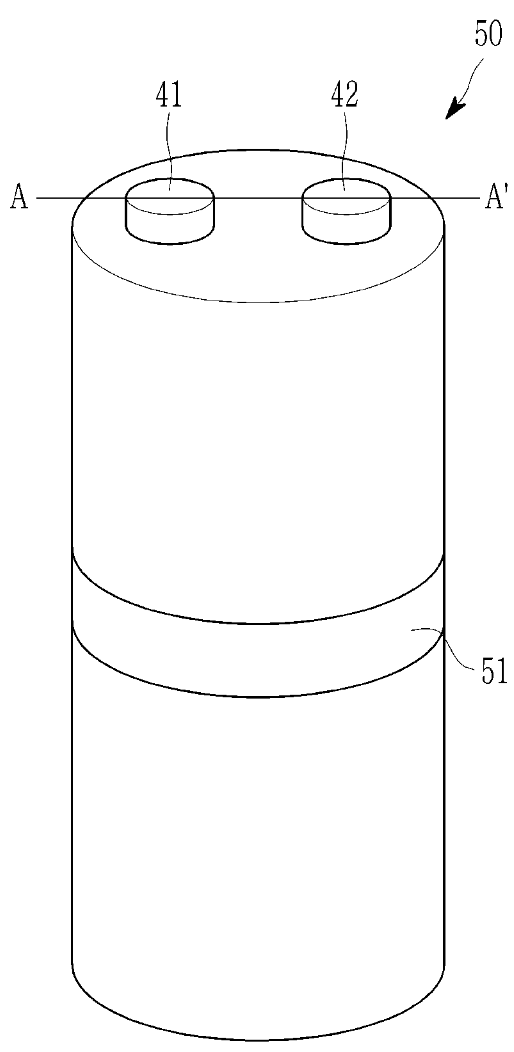
FIG. 3 is a view only showing a switching device according to an exemplary embodiment.

FIG. 3 is a view only showing a switching device according to an exemplary embodiment.

Figure 4:
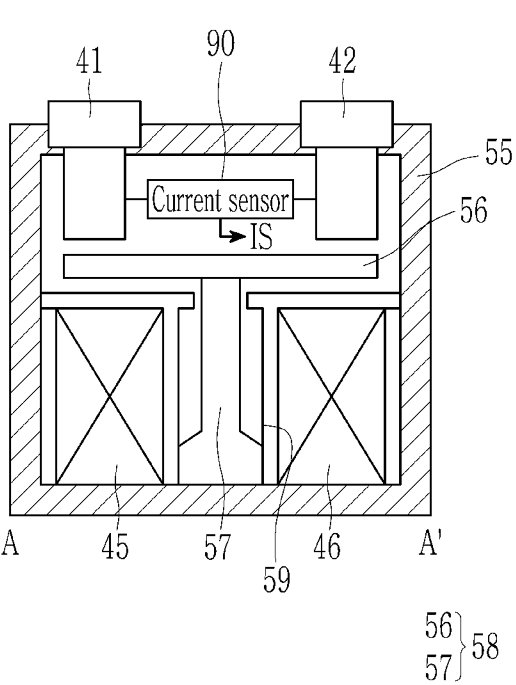
FIG. 4 is a view showing a cross-section of a switching device taken along a line A-A' in FIG. 3.

FIG. 4 is a view showing a cross-section of a switching device taken along a line A-A' in FIG. 3.

As shown in FIG. 4, the switching device 50 is shown as a plunger type, but the invention is not limited thereto. It may also be applied to other types of switching devices in which arcing occurs due to the relay opening.

The switching device 50 includes contact terminals 41 and 42, a plunger 58, coils 45 and 46, a housing 55, and a current sensor 48.

The housing 55 receives the configuration of the switching device 50, holds the contact terminals 41 and 42, and may be attached to the fixing substrate 90.

The current sensor 48 is connected between two contact terminals 41 and 42, and may sense a direction of a current flowing between the two contact terminals 41 and 42. In FIG. 4, although the current sensor 48 is illustrated as being connected between two contact terminals 41 and 42, the present invention is not limited thereto, and it may be connected to a different configuration so as to detect the direction of the current flowing between the two contact terminals 41 and 42. For example, the current sensor 48 may be electrically connected to the lines 31 and 32 outside the switching device 50 to sense the direction of the current. The current sensor 48 may generate a signal IS indicating the direction of the sensed current and transmit it to the relay control unit 300.

The plunger 58 includes a moving contact bar 56 and a shaft 57, and the shaft 57 is coupled to the moving contact bar 56 in the vertical direction and is positioned at the central passage 59, and may move along the central passage 59 by the magnetic field generated when the current flows in the coils 45 and 46.

The coils 45 and 46 may be implemented as solenoids. That is, the coils 45 and 46 are wound to surround the central passage 59 so that a solenoid shape with a hollow shape may be implemented. By supplying the voltage to both ends of the coils 45 and 46, the shaft 57 moves upward by the magnetic field generated when the current flows, and then the moving contact bar 56 is in contact with both contact terminals 41 and 42. Then, the battery system 1 and the output terminal P+ are connected, and the current may flow to a device electrically connected between two output terminals P+ and P−, or the corresponding current may be supplied from the device.

When the voltage applied to both terminals of the coils 45 and 46 is blocked, the current flowing to the coils 45 and 46 is blocked so that the shaft 57 moves downward, and the moving contact bar 56 is separated from the two contact terminals 41 and 42, thereby the current flowing from the battery system 1 or to the battery system 1 is blocked.

Figure 5:
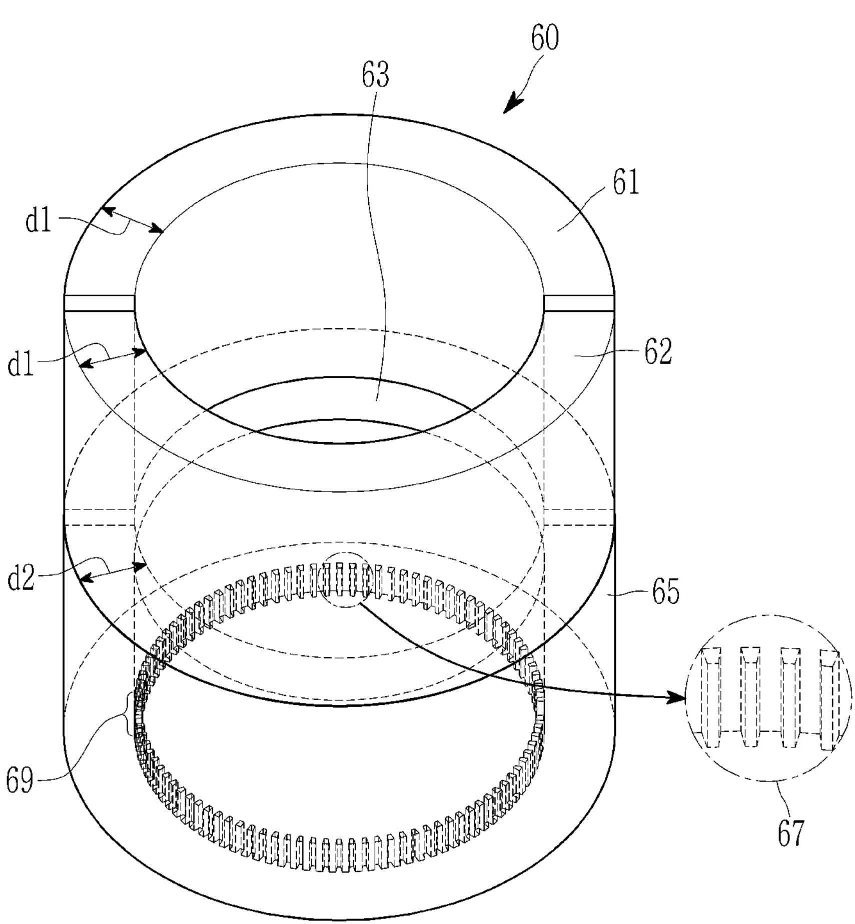
FIG. 5 is a view showing a magnetic device according to an exemplary embodiment.

FIG. 5 is a view showing a magnetic device according to an exemplary embodiment.

Figure 6:
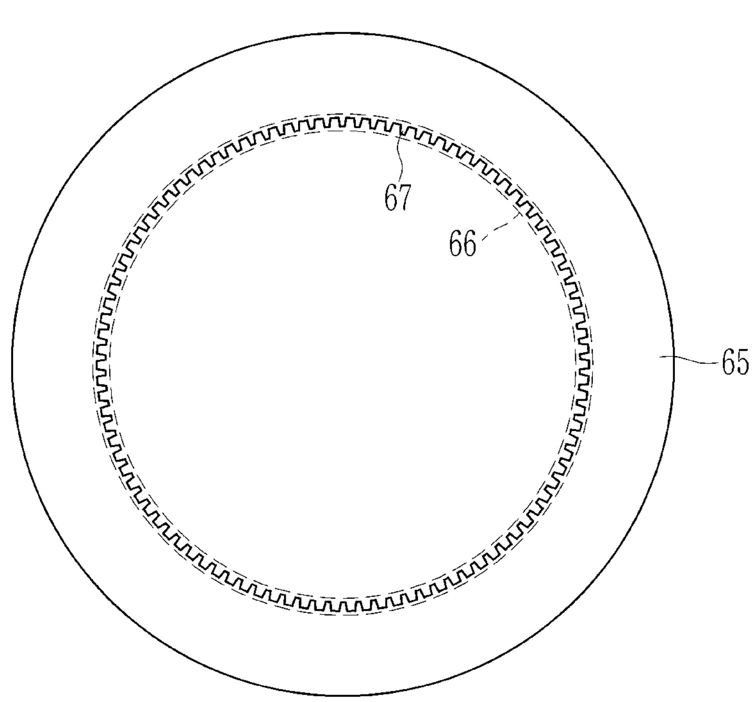
FIG. 6 is a rear view of a magnetic device according to an exemplary embodiment.

FIG. 6 is a rear view of a magnetic device according to an exemplary embodiment.

As shown in FIG. 5, the magnetic device 60 includes the two magnets 61 and 62 and the magnet rotation part 65. Each of the two magnets 61 and 62 has a shape in which only the outer portion of a predetermined thickness d1 is left in a column having a cross-section of a sector shape, and the magnet rotation part 65 has a shape in which only the outer portion of a predetermined thickness d2 is left in a circular cylinder. The central angle (Θ) of the sector-shaped cross-section of each of the two magnets 61 and 62 may be greater than or equal to a predetermined angle and less than 180 degrees. The thickness d2 may be greater than or equal to the thickness d1.

The magnet rotation part 65 includes a gear block 66 formed in a part (hereinafter referred to as "a gear interior circumference") 69 of the interior circumference.

As shown in FIG. 6, the gear block 66 includes a plurality of gear teeth (e.g., 67), and the plurality of gear teeth 67 are continuously formed along the gear interior circumference 69. The gear block 66 is rotated by the motor 70 so that the magnet rotation part 65 may be rotated. At this time, since the magnet rotation part 65 is coupled to the switching device 50 fixed by the ball bearing 80, it rotates in place.

Figure 7:
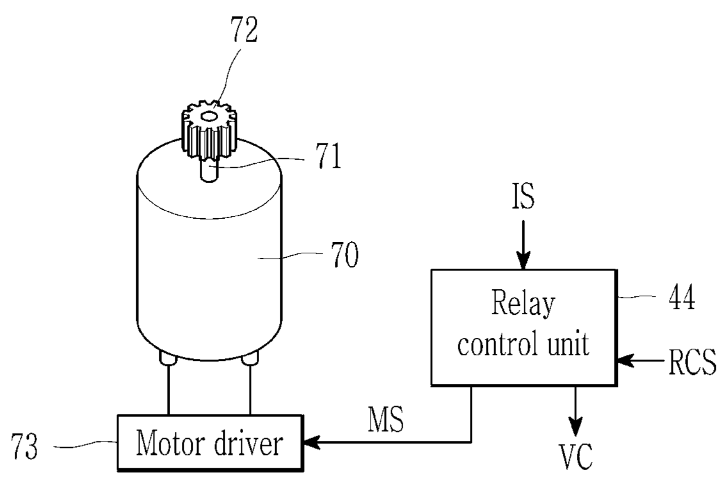
FIG. 7 is a view showing a motor, a motor driver, and a relay control unit according to an exemplary embodiment.

FIG. 7 is a view showing a motor, a motor driver, and a relay control unit according to an exemplary embodiment.

At the end of the shaft 71 of the motor 70, a gear block 72 in which a plurality of gear teeth are formed in a circular shape is coupled. The motor driver 73 is driven by supplying power to the motor 70 according to the motor driving signal MS supplied from the relay control unit 44. The gear block 72 of the shaft 71 and the gear block 66 of the magnet rotation part 65 are positioned close to each other so that the gear teeth may be engaged. When the power is supplied to the motor 70 and the shaft 71 rotates, the gear block 72 rotates around the shaft 71, a plurality of gear teeth of the gear block 72 and a plurality of gear teeth of the gear block 66 are sequentially engaged, and the magnet rotation part 65 rotates.

The relay control unit 44 may determine a current direction according to the current detection signal IS, detect a time when the current is cut off according to the relay control signal RCS, and generate a motor driving signal MS. The relay control unit 44 may generate a control signal VC for controlling the switching device 50 according to the relay control signal RCS. Depending on the control signal VC, the voltage is supplied to the coils 45 and 46 or is cut off.

Figure 8:
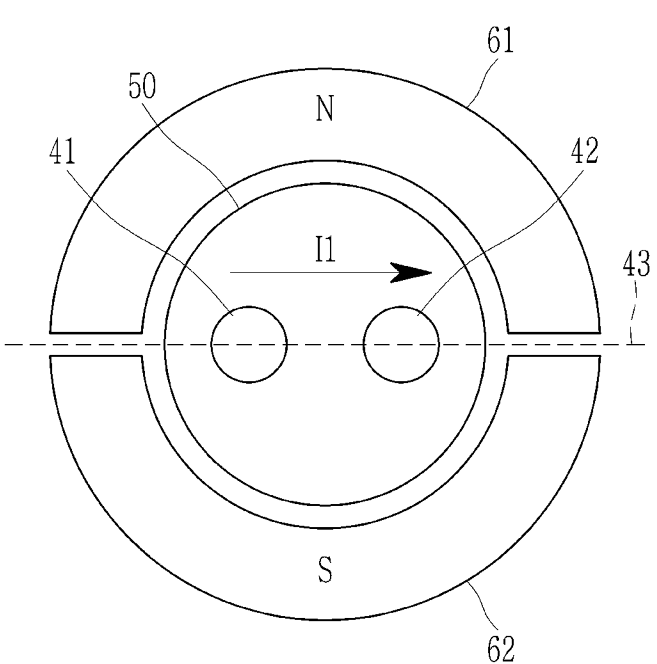
FIG. 8 and FIG. 9 are views showing an operation of a magnetic device according to a direction of a current.
Figure 9:
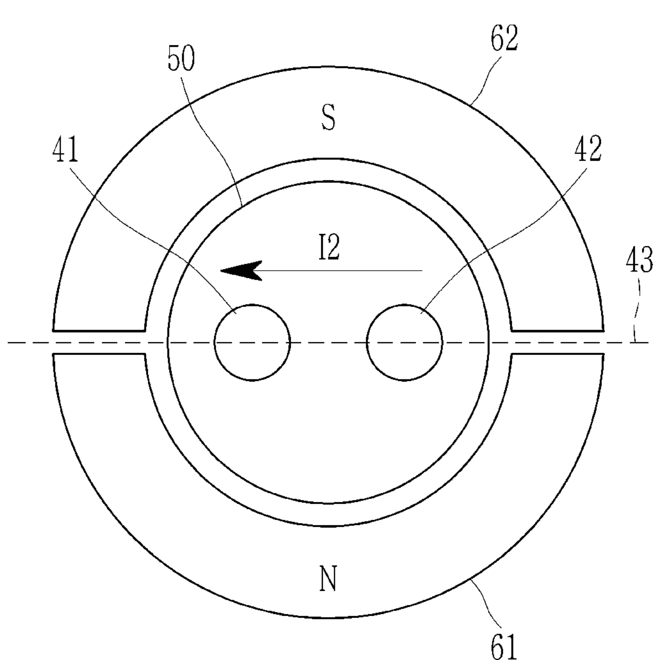

FIG. 8 and FIG. 9 are views showing an operation of a magnetic device according to a direction of a current.

First, as shown in FIG. 8, when the current I1 flows to the right in FIG. 8, the N-pole magnet 61 and the S-pole magnet 62 face each other based on the virtual reference line 43. At this time, the BMS 20 transmits the relay control signal RCS for opening the relay 40 to the relay control unit 44. Then, the relay control unit 44 determines the direction in which the current I1 flows by the current detection signal IS. As shown in FIG. 8, when the two magnets 61 and 62 are positioned, the arc occurs at the contact terminal in the direction outside the contact terminal, so they do not drive the motor 70.

After the relay 40 is opened, when it is closed again so that the current I2 flows to the left in FIG. 9, it is assumed that the BMS 20 transmits the relay control signal RCS that opens the relay 40 to the relay control unit 44.

The relay control unit 44 determines the direction in which the current I2 flows by the current detection signal IS, and transmits the motor driving signal MS to the motor driver 73. The motor driver 73 drives the motor 70 to rotate the magnet rotation part 65 by 180 degrees according to the motor driving signal MS. Then, as shown in FIG. 9, based on the virtual reference line 43, the N pole magnet 61 is positioned below, and the S pole magnet 62 is positioned above. Accordingly, even when the direction of the current I2 is opposite to the direction of the current I1, the arc is generated in the contact terminal in the direction outside the contact terminal.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A relay comprising:
a switching device including a moving contact bar electrically connecting two contact terminals when a current flows through a coil;
a magnetic device surrounding the switching device and including two magnets facing each other and aligned with one another along a virtual reference line connecting the two contact terminals;
a support positioned between an interior portion of an interior circumference of the magnetic device, and an exterior portion of an external circumferential surface of the switching device, and configured to support the magnetic device, wherein the magnetic device is rotatable while being supported by the support; and
a current sensor configured to detect a direction of a corresponding current flowing between the two contact terminals,
wherein the two magnets are controlled by a controller to rotate depending on the detected direction of the corresponding current.

2. The relay of claim 1, further comprising
a base coupled to a bottom surface of the switching device, wherein the switching device is affixed to the base.

3. The relay of claim 1, wherein
the magnetic device further includes:
a magnet rotation part; and
two magnets positioned on an upper surface of the magnetic rotation part and facing one another in a fixed position relative to one another, and
wherein the controller is configured to, in response to a change in the direction of the corresponding current, rotate the magnet rotation part such that respective positions of the two magnets switch with each other.

4. The relay of claim 3, wherein
the magnet rotation part includes a first gear block including a first plurality of gear teeth formed along an interior circumference of the first gear block,
the relay includes a motor including a second gear block including a second plurality of gear teeth formed in a circular shape, wherein the second gear block is positioned at a bottom end of a shaft, and
the second gear block and the first gear block are positioned such that the first gear teeth are engaged with the second gear teeth.

5. The relay of claim 4, further comprising
a motor driver configured to drive the motor to rotate 180 degrees in response to the change in the direction of the corresponding current.

6. The relay of claim 3, wherein
each of the two magnets has a semi-annular shape, and
the magnet rotation part has an annular shape.

7. The relay of claim 1, wherein the controller is configured to:
in response to the corresponding current flowing in a first direction, position a first magnet of the two magnets on a first side of the virtual reference line, and a second magnet of the two magnets on a second side of the virtual reference line; and
in response to the corresponding current flowing in a second direction opposite the first direction, position the first magnet on the second side of the virtual reference line, and the second magnet on the first side of the virtual reference line.

8. The relay of claim 1, wherein
the support is a ball bearing.

9. A battery system comprising:
a battery pack including a plurality of battery cells; and
a relay including a first contact terminal connected to a first end of the battery pack and a second contact terminal connected to an output terminal,
wherein the relay includes:
a switching device including a moving contact bar electrically connecting the first and second contact terminals when a current flows through a coil;
a magnetic device surrounding the switching device and including two magnets facing each other and aligned with one another along a virtual reference line connecting the first and second contact terminals;
a support positioned between an interior portion of an interior circumference of the magnetic device, and an exterior portion of an external circumferential surface of the switching device, and configured to support the magnetic device, wherein the magnetic device is rotatable while being supported by the support; and
a controller configured to control a rotation of the two magnets according to a direction of a relay current flowing between the first and second contact terminals.

10. The battery system of claim 9, wherein
the magnetic device further includes:
a magnet rotation part; and
two magnets positioned on an upper surface of the magnetic rotation part and facing one another in a fixed position relative to one another, and
wherein the control is configured to, in response to a change in the direction of the relay current, rotate the magnet rotation part such that respective positions of the two magnets switch with each other.

11. The battery system of claim 10, wherein
each of the two magnets has a semi-annular shape, and
the magnet rotation part has an annular shape.

12. The battery system of claim 9, wherein the controller is configured to:
in response to the relay current flowing in a first direction, position a first magnet of the two magnets on a first side of the virtual reference line, and a second magnet of the two magnets on a second side of the virtual reference line, and
in response to the relay current flowing in a second direction opposite the first direction, position the first magnet on the second side of the virtual reference line, and the second magnet on the first side of the virtual reference line.

13. The battery system of claim 9, wherein
the support is a ball bearing.

* * * * *